US011593591B2

(12) United States Patent
Ackley

(10) Patent No.: US 11,593,591 B2
(45) Date of Patent: Feb. 28, 2023

(54) OPTICAL CHARACTER RECOGNITION SYSTEMS AND METHODS

(71) Applicant: Hand Held Products, Inc., Fort Mill, SC (US)

(72) Inventor: H. Sprague Ackley, Seattle, WA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 157 days.

(21) Appl. No.: 16/867,318

(22) Filed: May 5, 2020

(65) Prior Publication Data

US 2020/0311478 A1 Oct. 1, 2020

Related U.S. Application Data

(63) Continuation of application No. 15/793,407, filed on Oct. 25, 2017, now Pat. No. 10,679,101.

(51) Int. Cl.
*G06K 9/62* (2022.01)
*G06V 10/88* (2022.01)
(Continued)

(52) U.S. Cl.
CPC ......... *G06K 9/6261* (2013.01); *G06V 10/751* (2022.01); *G06V 10/88* (2022.01);
(Continued)

(58) Field of Classification Search
CPC ......... G06K 2209/01; G06K 19/06028; G06K 7/1095; G06K 7/1413; G06K 7/1443; G06K 9/58; G06K 9/723
See application file for complete search history.

(56) References Cited

U.S. PATENT DOCUMENTS 4,468,809 A 8/1984 Grabowski et al.
5,077,809 A * 12/1991 Ghazizadeh ............. G06K 9/50
382/217

(Continued)

FOREIGN PATENT DOCUMENTS

WO 2013/163789 A1 11/2013

OTHER PUBLICATIONS

Communication Pursuant to Article 94(3) issued in European Application No. 18202437.2, dated Jun. 22, 2021, 4 pages.

(Continued)

*Primary Examiner* — Guillermo M Rivera-Martinez
(74) *Attorney, Agent, or Firm* — Alston & Bird LLP

(57) ABSTRACT

The present disclosure is generally directed to systems and methods for executing optical character recognition faster than at least some traditional OCR systems, without sacrificing recognition accuracy. Towards this end, various exemplary embodiments involve the use of a bounding box and a grid-based template to identify certain unique aspects of each of various characters and/or numerals. For example, in one embodiment, the grid-based template can be used to recognize a numeral and/or a character based on a difference in centerline height between the numeral and the character when a monospaced font is used. In another exemplary embodiment, the grid-based template can be used to recognize an individual digit among a plurality of digits based on certain parts of the individual digit being uniquely located in specific portions of the grid-based template.

20 Claims, 8 Drawing Sheets

(51) Int. Cl.
*G06V 10/75* (2022.01)
*G06V 30/244* (2022.01)
*G06V 30/32* (2022.01)
*G06V 30/224* (2022.01)
*G06V 30/10* (2022.01)

(52) U.S. Cl.
CPC ........ *G06V 30/2247* (2022.01); *G06V 30/244* (2022.01); *G06V 30/373* (2022.01); *G06V 30/10* (2022.01)

(56) References Cited

U.S. PATENT DOCUMENTS

| | | | |
|---|---|---|---|
| 5,208,869 A * | 5/1993 | Holt | G06K 9/00 382/138 |
| 5,367,578 A * | 11/1994 | Golem | G06K 9/6202 382/183 |
| 5,539,840 A * | 7/1996 | Krtolica | G06K 9/6202 382/195 |
| 5,835,634 A * | 11/1998 | Abrams | G06K 9/6202 382/222 |
| 5,852,685 A | 12/1998 | Shepard | |
| 5,880,451 A * | 3/1999 | Smith | G06K 7/1473 235/462.1 |
| 5,915,039 A * | 6/1999 | Lorie | G06K 9/32 382/230 |
| 6,038,342 A * | 3/2000 | Bernzott | G06K 9/00463 382/173 |
| 6,259,814 B1 * | 7/2001 | Krtolica | G06K 9/4609 382/205 |
| 6,321,986 B1 * | 11/2001 | Ackley | G06K 1/121 235/462.01 |
| 6,337,924 B1 * | 1/2002 | Smith | G06K 9/6828 382/175 |
| 6,366,696 B1 * | 4/2002 | Hertz | G06K 9/32 382/181 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,401,299 B2 | 3/2013 | Nakamura | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre, Jr. | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz, Sr. | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,755,604 B1 | 6/2014 | Gross et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |

(56) References Cited

U.S. PATENT DOCUMENTS

| | | |
|---|---|---|
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue et al. |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein, Jr. |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,031 B2 | 7/2015 | Liu et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,195,907 B1 | 11/2015 | Longacre, Jr. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |

(56) References Cited

U.S. PATENT DOCUMENTS

| | | |
|---|---|---|
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein, Jr. |
| 9,412,242 B2 | 8/2016 | Van et al. |
| 9,418,269 B2 | 8/2016 | Havens et al. |
| 9,418,270 B2 | 8/2016 | Van et al. |
| 9,423,318 B2 | 8/2016 | Liu et al. |
| 9,424,454 B2 | 8/2016 | Tao et al. |
| D766,244 S | 9/2016 | Zhou et al. |
| 9,436,860 B2 | 9/2016 | Smith et al. |
| 9,443,123 B2 | 9/2016 | Hejl |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 10,679,101 B2 | 6/2020 | Ackley |
| 2002/0113125 A1* | 8/2002 | Schuessler ............ G06K 1/121 235/462.1 |
| 2004/0047508 A1* | 3/2004 | Anisimovich ....... G06K 9/6255 382/218 |
| 2004/0074967 A1* | 4/2004 | Takakura ................ G06K 7/14 235/462.08 |
| 2007/0051814 A1* | 3/2007 | Ehrhart ............. G06K 9/00442 235/462.08 |
| 2007/0063048 A1 | 3/2007 | Havens et al. |
| 2008/0137955 A1* | 6/2008 | Tsai .................... G06K 9/6814 382/176 |
| 2008/0185432 A1 | 8/2008 | Caballero et al. |
| 2008/0310765 A1* | 12/2008 | Reichenbach ....... G06K 7/1443 382/312 |
| 2009/0134221 A1 | 5/2009 | Zhu et al. |
| 2009/0161930 A1 | 6/2009 | Zahniser |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2010/0310172 A1* | 12/2010 | Natarajan .......... G06K 9/00865 382/187 |
| 2011/0022940 A1* | 1/2011 | King ................... G06F 16/9554 715/229 |
| 2011/0134458 A1* | 6/2011 | Kojima ................ G06F 3/1243 358/1.14 |
| 2011/0169999 A1 | 7/2011 | Grunow et al. |
| 2011/0202554 A1 | 8/2011 | Powilleit et al. |
| 2011/0294543 A1* | 12/2011 | Lapstun ............. H04N 1/00129 455/556.1 |
| 2012/0087551 A1* | 4/2012 | Bhagwan .......... G06K 9/00255 382/118 |
| 2012/0111946 A1 | 5/2012 | Golant |
| 2012/0128251 A1* | 5/2012 | Petrou ................ G06K 9/00456 382/182 |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0075168 A1 | 3/2013 | Amundsen et al. |
| 2013/0077856 A1* | 3/2013 | Ferro .................. G06K 9/6255 382/159 |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0037181 A1* | 2/2014 | Koo ..................... G06K 9/6814 382/135 |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |

(56) References Cited

U.S. PATENT DOCUMENTS

| | | |
|---|---|---|
| 2014/0064618 A1* | 3/2014 | Janssen, Jr. ........ G06K 9/00469 382/182 |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0023599 A1 | 1/2015 | Geva |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley et al. |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2015/0339526 A1* | 11/2015 | Macciola ................ G06T 7/11 382/195 |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0070944 A1 | 3/2016 | McCloskey et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |

(56) References Cited

U.S. PATENT DOCUMENTS

| | | |
|---|---|---|
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0199266 A1 | 7/2017 | Rice et al. |
| 2017/0200108 A1 | 7/2017 | Au et al. |
| 2017/0200275 A1 | 7/2017 | McCloskey et al. |
| 2017/0220886 A1* | 8/2017 | Canero Morales ............ G06K 9/00483 |
| 2017/0235991 A1 | 8/2017 | Unemyr et al. |
| 2017/0244850 A1* | 8/2017 | Ishitori ............... H04N 1/0044 |
| 2017/0270508 A1* | 9/2017 | Roach .................. G06K 9/3275 |
| 2017/0293788 A1* | 10/2017 | Taira .................... G06K 7/1443 |
| 2017/0293817 A1* | 10/2017 | Bonch-Osmolovsky .................... G06K 9/6202 |
| 2018/0336226 A1* | 11/2018 | Anorga ................ G06N 20/00 |

OTHER PUBLICATIONS

Bigelow, Oh, oh, zero!, TUGboat, vol. 34, No. 2, Aug. 1, 2013, pp. 168-181 [Cited in EP Search Report].

European Search Report and Search Opinion Received for EP Application No. 18202437.2, dated Mar. 13, 2019, 8 pages.

Examiner initiated interview summary (PTOL-413B) dated Feb. 5, 2020 for U.S. Appl. No. 15/793,407.

Final Rejection dated Nov. 15, 2019 for U.S. Appl. No. 15/793,407.

Frutiger, "OCR-B: A Standardized Character for Optical Recognition", The Journal of Typographic Research, vol. 1, No. 2, Apr. 1, 1967, pp. 137-146 [Cited in EP Search Report].

Non-Final Rejection dated May 3, 2019 for U.S. Appl. No. 15/793,407.

Notice of Allowance and Fees Due (PTOL-85) dated Feb. 5, 2020 for U.S. Appl. No. 15/793,407.

Rule 70 (2) Communication for European Application No. 18202437. 2, dated May 5, 2019, 2 pages.

(56) References Cited

OTHER PUBLICATIONS

Search Report in related European Application No. 18202437.2 dated Mar. 19, 2019, pp. 1-9.

* cited by examiner

| Coordinate locations | Corresponding Identifiable Letters |
|---|---|
| 405 | A, Q |
| 410 | H, N, W, X |
| 415 | J, L, U, V |
| Combination of 405 and 410 | F, P, R |
| Combination of 405 and 415 | C, D, G, O |
| Combination of 410 and 415 | Y |
| Combination of 405, 410 and 415 | B, E, I, S, T, Z |
| Not in any of 405, 410, 415 | K, M, < |

OPTICAL CHARACTER RECOGNITION SYSTEMS AND METHODS

CROSS-REFERENCE TO RELATED APPLICATION

This application is a continuation of and claims priority to U.S. patent application Ser. No. 15/793,407, titled "OPTICAL CHARACTER RECOGNITION SYSTEMS AND METHODS," and filed on Oct. 25, 2017, the entire content of which is hereby incorporated by reference.

FIELD OF THE INVENTION

The present invention generally relates to optical character recognition systems and more particularly relates to systems and methods for improving recognition speed.

BACKGROUND

Traditional optical character recognition (OCR) systems often tend to sacrifice speed in the interests of ensuring accuracy in character recognition. The traditional character recognition process typically incorporates a template to execute a character-by-character recognition of various characters. The template, which can be one of a number of different types of templates, is associated with a pattern-matching algorithm that identifies a specific numeral or a letter of an alphabet. Certain characters such as the numeral zero and the letter O are relatively similar to each other. Consequently, the process of using the pattern-matching algorithm tends to be slow in order to ensure that such characters are not misinterpreted. However, it is desirable to provide systems and methods that provide for faster optical character recognition without sacrificing accuracy.

SUMMARY

In an exemplary embodiment in accordance with the disclosure, a method includes using an optical character recognition system to execute an optical character recognition procedure. The optical character recognition procedure includes applying a grid-based template to a character having a monospaced font; defining in the grid-based template, a first grid section that includes a first portion of the character when the character has a first size and excludes the first portion of the character when the character has a second size that is smaller than the first size; and recognizing the character as a numeral when the first grid section includes the first portion of the character.

In another exemplary embodiment in accordance with the disclosure, a method includes providing to an optical character recognition system, a barcode label containing a plurality of digits, and using the optical character recognition system to execute an optical character recognition procedure. The optical character recognition procedure includes applying a bounding box to an individual digit among the plurality of digits contained in the barcode label; applying a grid-based template to the bounding box, the grid-based template comprising a plurality of grid sections; and using the plurality of grid sections to identify the individual digit contained in the bounding box.

In yet another exemplary embodiment in accordance with the disclosure, a method includes using an optical character recognition system to execute an optical character recognition procedure. The optical character recognition procedure includes applying a bounding box to a character; applying a grid-based template to the bounding box; defining a portion of the grid-based template as a primary search area; and using at least the primary search area to identify the character contained in the bounding box.

The foregoing illustrative summary, as well as other exemplary objectives and/or advantages described in this disclosure, and the manner in which the same are accomplished, are further explained within the following detailed description and its accompanying drawings.

BRIEF DESCRIPTION OF THE DRAWINGS

FIG. 5 shows an exemplary list of coordinate locations in a grid-based template that can be used to uniquely identify letters of the English alphabet in accordance with the disclosure.

FIG. 8 shows an exemplary set of coordinate locations and a look-up table that can be used in conjunction with the set of coordinate locations to uniquely identify any character using a single-step recognition procedure in accordance with the disclosure.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, the word "numeral" as used herein is equally applicable to other words such as "digit" and "number." The word "character" as used herein pertains to any printed or written material that is recognizable using optical character recognition techniques. It should also be understood that the word "example" as used herein is intended to be non-exclusionary and non-limiting in nature. More particularly, the word "exemplary" as used herein indicates one among several examples and it should be understood that no special emphasis, exclusivity, or preference, is associated or implied by the use of this word.

The present disclosure is generally directed to systems and methods for executing optical character recognition faster than at least some traditional OCR systems, without sacrificing recognition accuracy. Towards this end, various exemplary embodiments involve the use of a bounding box and a grid-based template to identify certain unique aspects of each of various characters and/or numerals. For example, in one embodiment, the grid-based template can be used to recognize a numeral and/or a character based on a difference in centerline height between the numeral and the character when a monospaced font is used. In another exemplary embodiment, the grid-based template can be used to recognize an individual digit among a plurality of digits based on certain parts of the individual digit being uniquely located in specific portions of the grid-based template.

Figure 1:
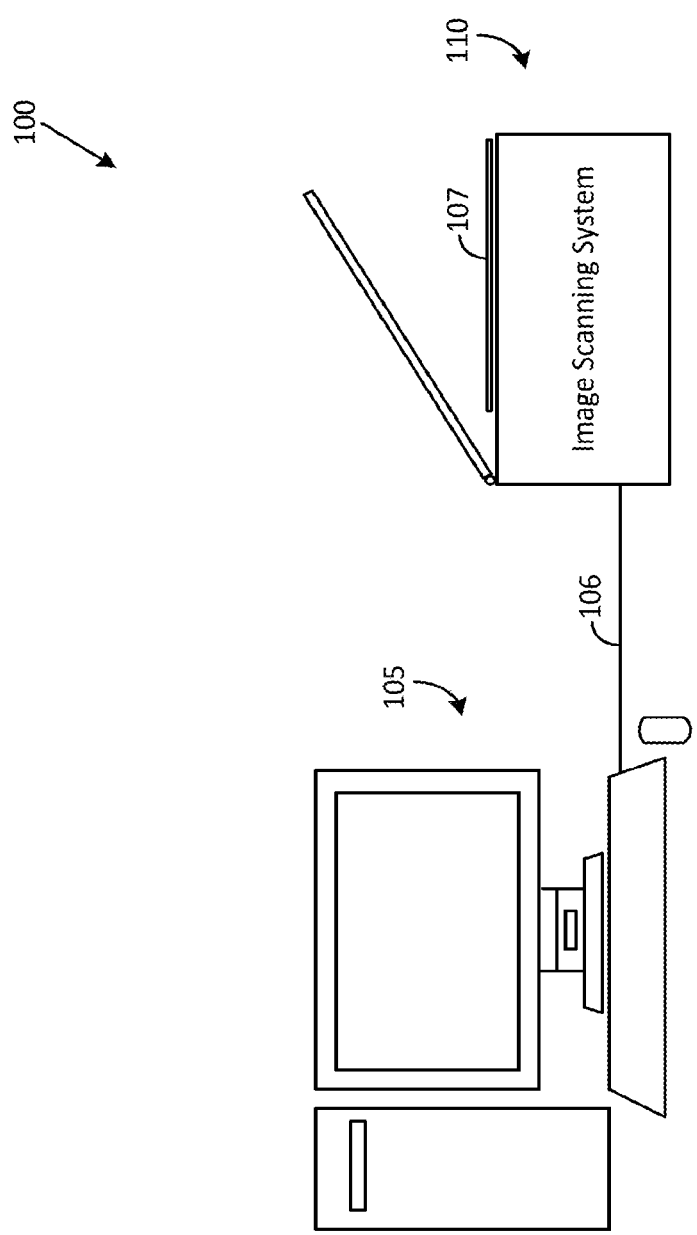
FIG. 1 schematically depicts an exemplary embodiment of an OCR system in accordance with the disclosure.

FIG. 1 schematically depicts a depicts an exemplary OCR system 100 in accordance with the disclosure. The OCR system 100 depicted in this exemplary embodiment includes an image scanning system 110 (a flat-bed scanner in this example) communicatively coupled to a computer 105. In other embodiments, various other hardware elements such as a handheld scanner or an overhead scanner can constitute the image scanning system 110.

When in operation, the image scanning system 110 captures an image of characters and text located on an object 107 such as a printed sheet of paper or a machine-readable zone (MRZ) on a passport. The captured image is provided to the computer 105 via a communication link 106 (wire, communications cable, wireless etc.). The computer 105 includes OCR software that is used to carry out OCR operations upon the captured image in accordance with the disclosure.

In an alternative embodiment, the computer 105 can be omitted and the OCR software incorporated into the image scanning system 110, which operates as a multifunction unit to execute various operations such as scanning, printing, faxing, and OCR.

In yet another alternative embodiment, the image scanning system 110 can be omitted and the computer 105 configured to generate a document and/or receive a document via a communication network such as the Internet. OCR software contained in the computer 105 in accordance with the disclosure can then be used to carry out OCR operations upon the received/generated document.

Figure 2:
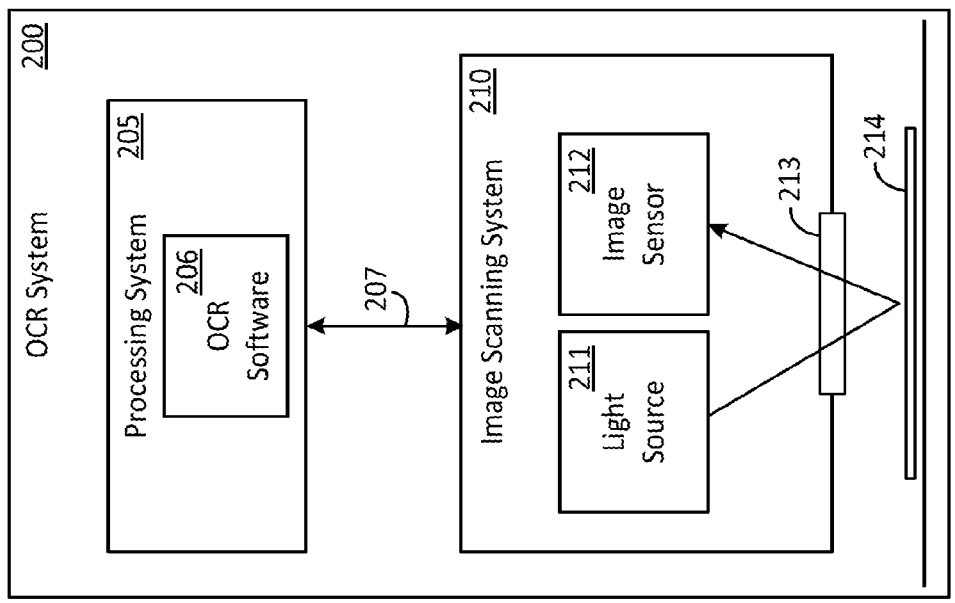
FIG. 2 schematically depicts another exemplary embodiment of an OCR system in accordance with the disclosure.

FIG. 2 schematically depicts an exemplary OCR system 200 in accordance with the disclosure. OCR system 200 includes an image scanning system 210 communicatively coupled to a processing system 205 via a communications link 207 (such as a wire, a communications cable, a wireless link, or a metal track on a printed circuit board). The image scanning system 210 includes a light source 211 that projects light through a transparent window 213 upon an object 214. The object 214, which can be a sheet of paper containing text and/or images, reflects the light towards an image sensor 212. The image sensor 212, which contains light sensing elements such as photodiodes and/or photocells, converts the received light into electrical signals (digital bits for example) that are transmitted to the OCR software 206 contained in the processing system 205. In one example embodiment, the OCR system 200 is a slot scanner incorporating a linear array of photocells. The OCR software 206 that is a part of the processing system 205 can be used in accordance with the disclosure to operate upon the electrical signals for performing optical character recognition of the material printed upon the object 214.

Figure 3:
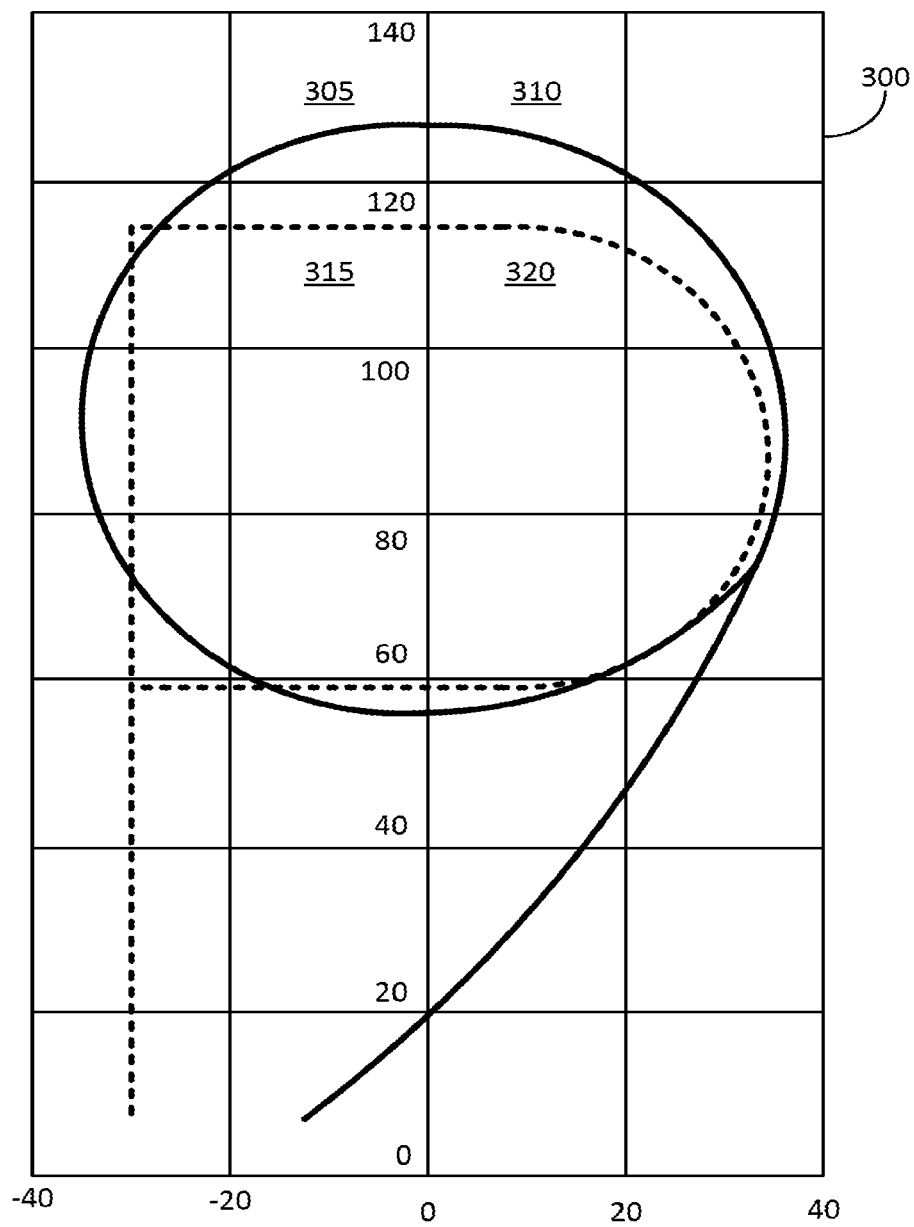
FIG. 3 shows an exemplary grid-based template that can be used to execute optical character recognition in accordance with the disclosure.

FIG. 3 shows a first exemplary grid-based template 300 that can be used to execute optical character recognition in accordance with the disclosure. The exemplary grid-based template 300, which is executed in the form of a software algorithm, has a rectangular shape with an x-axis having a first set of numerical coordinates (ranging from −40 to +40 in this example) and a y-axis having a second set of numerical coordinates (ranging from 0 to 140 in this example). The numerical coordinates of this x-y mapping system can be used to define various grid sections in the grid-based template 300 (grid section 305, grid section 310, grid section 315, etc.).

More particularly, in accordance with the disclosure, the grid-based template 300 can be used to perform character recognition upon various text characters such as a numeral "9" and a letter "P" of an alphabet that are shown as examples. In one or more exemplary implementations, the characters can conform to what is known in the industry as an OCR font. One specific OCR font that is popular in the industry is an OCR-B font. The OCR-B font, which resembles an Ariel font to some extent, is used on various items such as passports, car license plates, and as human-readable characters in barcode symbols (European Article Number (EAN) barcodes and Universal Product Code (U. P. C.) barcodes for example).

The OCR-B font has been specifically tailored to minimize machine reading errors. However, even with such tailoring, it is often quite time-consuming for traditional OCR systems to execute character recognition, because each character has to be recognized using a multi-step template-based matching procedure involving the use of a number of templates. For example, the International Civil Aviation Organization (ICAO) uses thirty-seven templates for identifying various characters in a passport. Thus, for a symbol containing 20 characters, a traditional multi-step template-based matching procedure can involve executing 740 match attempts using the thirty-seven templates (20×37=740).

The use of the grid-based template 300 to perform character recognition in accordance with the disclosure will now be described. The similarity in shapes between these two exemplary characters ("9" and "P") poses a challenge to any OCR system, particularly to a traditional system that uses a multi-step template-based matching procedure involving a relatively large number of templates. Thus, in one exemplary method in accordance with the disclosure, the first step involves the use of the grid-based template 300 to identify differences between the two characters on the basis of size. Such an approach takes advantage of the fact that in various fonts, and particularly in the OCR-B font, numerals have a different size in comparison to the letters of an alphabet.

More particularly, the OCR-B font is a monospaced font having a fixed distance spacing between adjacent characters and variable-height for the various characters. The rectangular shape of the grid-based template 300 is configured to accommodate numerals and letters that are aligned with respect to a common reference point (in this example, the common reference point corresponds to the coordinates 0,0 of the grid-based template 300), thereby allowing a comparison of centerline heights between two or more characters. The numerals can be quickly detected based on the fact that the centerline height of all numerals is greater than the centerline height of all letters of an alphabet when the OCR-B font is used. In some implementations in accordance with the disclosure, a primary search area can be defined as a circle having a diameter that is substantially equal to a width of the monospaced font or an oval having a minor axis that is substantially equal to a width of the monospaced font and a major axis that is substantially equal to a centerline height of a numeral in the monospaced font.

With respect to the two exemplary characters shown in FIG. 3, the numeral "9" has a centerline height that approximately corresponds to a numerical coordinate 128 on the y-axis of the grid-based template 300. In contrast, the letter "P" is shorter than the numeral "9" and has a centerline height that approximately corresponds to a numerical coordinate 118 on the y-axis of the grid-based template 300.

The software algorithm used for executing the grid-based template 300 can recognize that a portion of the numeral "9" is present in certain grid sections such as in grid section 305 and grid section 310, whereas no portion of the letter "P" (which is shorter than the numeral "9") is present in either grid section 305 or grid section 310. More particularly, when using the exemplary grid-based template 300, none of the grid sections above the numerical coordinate 120 will contain any portion of a letter.

Thus, in accordance with the disclosure, the software algorithm is used to apply the grid-based template 300 to an image and rapidly differentiate between a numeral and a letter based on the centerline height difference between numerals and letters of a monospaced font. The differentiating procedure thus eliminates a large subset of characters from being considered as potential candidates for further processing.

Figure 4:
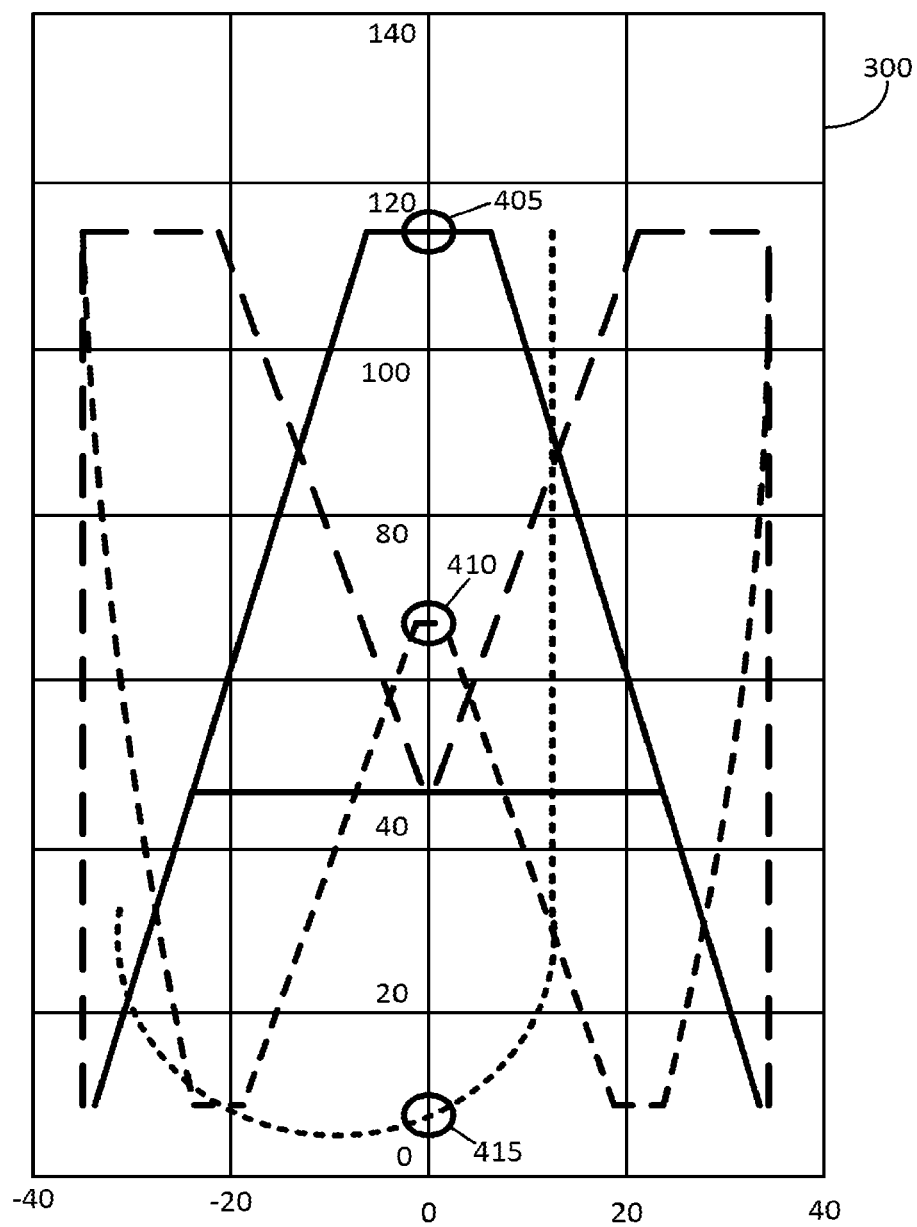
FIG. 4 shows an exemplary grid-based template that can be used to execute optical character recognition for identifying a specific letter of an alphabet in accordance with the disclosure.

FIG. 4 shows the grid-based template 300 when used to execute optical character recognition for identifying a specific letter of an alphabet in accordance with the disclosure. As described above, no portion of the character will be present in the grid sections above the numerical coordinate 120 in this example. Consequently, the software algorithm limits the processing to grid sections below the numerical coordinate 120 and can further limit the processing to a minimal set of grid locations (three grid sections, for example) in the grid sections below the numerical coordinate 120. The minimal set of grid locations can also be defined at least in part by a circle having a diameter that is substantially equal to a width of the monospaced font or an oval having a minor axis that is substantially equal to a width of the monospaced font and a major axis that is substantially equal to a centerline height of a numeral in the monospaced font.

The processing involves identifying a letter by searching for a presence of a portion of a number of candidate letters (a through z, when the letter is a part of an English alphabet) in various grid sections of the grid-based template 300. An inefficient way to carry out the search would involve a time-consuming scan of each and every grid section of the grid-based template 300. On the other hand, in accordance with the disclosure, the search is carried out by first eliminating from the search, grid sections that are known beforehand as areas in which any portion of any letter will not be present. The search is thus confined to areas where it is feasible that portions of any one of various letters may be present. The search is further narrowed to examine certain unique grid coordinate locations on the grid-based template 300 that would assist in quickly identifying a specific letter among all the potential candidates.

Accordingly, in one exemplary embodiment, the narrowed search procedure involves examining a group of three coordinate locations in a minimal group of grid sections along the y-axis of the grid-based template 300. The three coordinate locations (coordinate location 405, coordinate location 410, and coordinate location 415) provide information that assists in uniquely identifying a particular letter among a set of letters. The set of letters shown in exemplary FIG. 4, are A, J, M, and W. A portion of the letter A is present at the coordinate location 405 corresponding to (0, 118), which is unique to the letter A. No portion of J, M or W is present at the first coordinate location 405.

A portion of the letter W is present at a coordinate location 410 corresponding to (0, 68), which is unique to the letter W. No portion of A, J or M is present at the second coordinate location 410.

A portion of the letter J is present at the coordinate location 415 corresponding to (0, 8), which is unique to the letter J. No portion of A, M or W is present at the third coordinate location 415.

The letter M has no portion present at any of the coordinate location 405, the coordinate location 410, or the coordinate location 415.

In another exemplary embodiment, the narrowed search procedure involves examining a set of four grid sections located at four corners of the grid-based template 300. This set of four grid sections can provide additional information such as the presence of portions of each of multiple letters and/or an absence of one or more portions of one or more letters.

Upon completing the search procedure at the group of three exemplary coordinate locations, the software algorithm uses a lookup table to at least make a preliminary determination of the identity of the letter. The lookup table includes information indicating that the letter A is uniquely identifiable via the first coordinate location 405, the letter W is uniquely identifiable via the second coordinate location 410, the letter J is uniquely identifiable via the third coordinate location 415, and so on. Using a compact search procedure that is based on three unique coordinate locations (in this example) coupled with the use of a lookup table, allows for a fast recognition of various letters in accordance with the disclosure. In other exemplary search procedures, fewer or greater than three coordinate locations can be used. Furthermore, in some embodiments, the use of unique coordinate locations as described above, allows for execution of a search procedure for identifying a letter without necessarily first making a determination whether the character is a numeral or a letter.

FIG. 5 shows an exemplary list of coordinate locations in the grid-based template 300 that can be used to uniquely identify letters of the English alphabet in accordance with the disclosure. As can be understood from the list, some letters, such as F, P, R, B, E, for example, can be identified by using a combination of two or more unique coordinate locations because these letters cannot be uniquely identified by using a single coordinate location such as done for A, J, M, and W described above. Furthermore, certain letters such as K and M can be identified by using a default identification mode as no portion of any of these letters are present in the three coordinate locations. The default identification mode can be applied after completion of search for letters such as A, J, M, and W based on the three coordinate locations.

Figure 6:
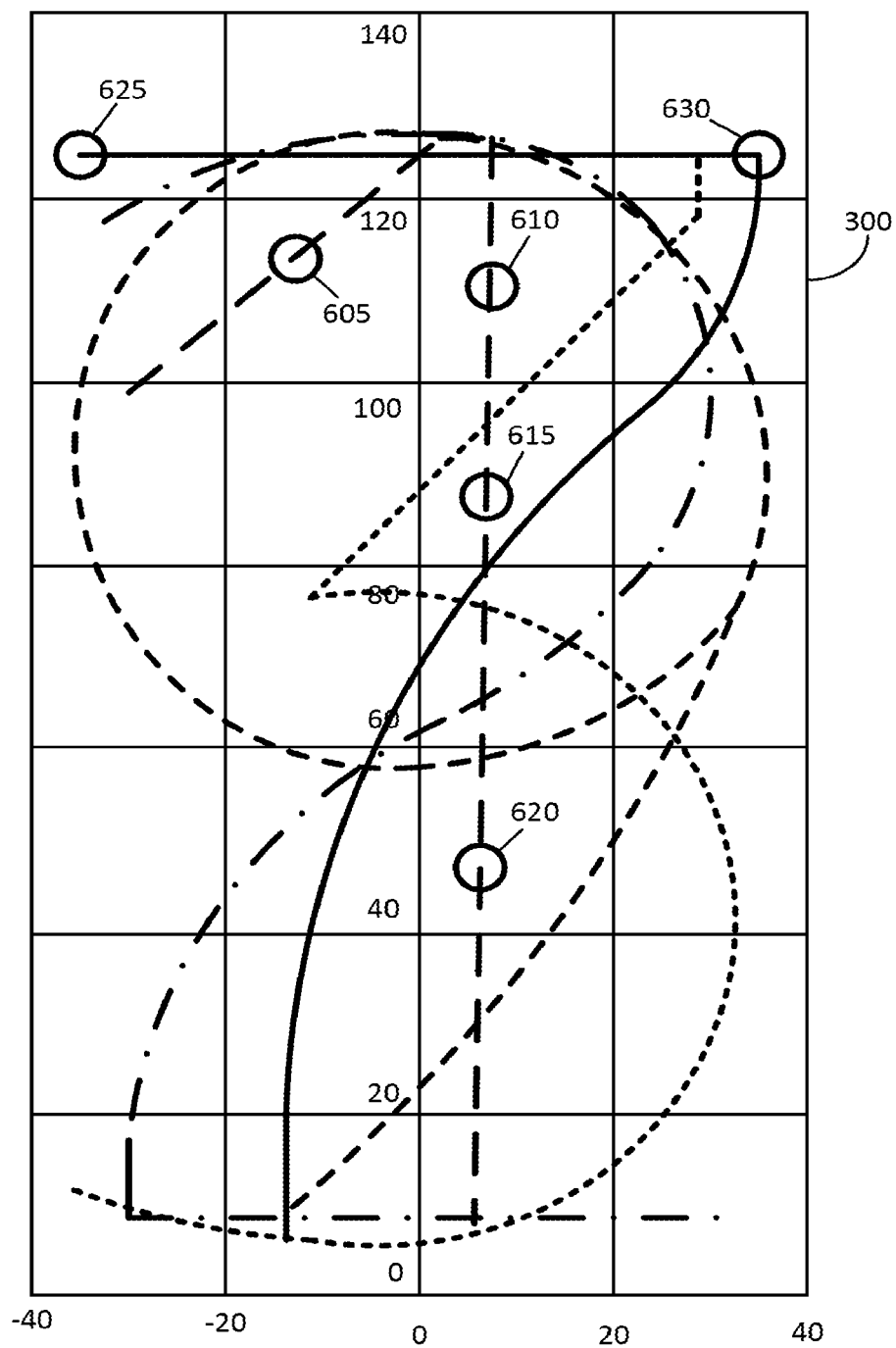
FIG. 6 shows an exemplary grid-based template when used to execute optical character recognition for identifying a specific numeral in accordance with the disclosure.

FIG. 6 shows the grid-based template 300 when used to execute optical character recognition for identifying a specific numeral in accordance with the disclosure. In a manner similar to that described above when using the grid-based template 300 to identify a specific letter, a search can be carried out in accordance with the disclosure to detect the presence of a numeral at certain unique coordinate locations and/or grid sections on the grid-based template 300.

Accordingly, in one exemplary embodiment, a search procedure is carried out by first eliminating from the search, grid sections that are known beforehand as areas in which any portion of any numeral will not be present. The search is thus confined to areas where any one of various numerals can be present. However, the search is further narrowed to first examine certain unique grid sections and/or grid coordinate locations where portions of one or more specific numerals may be present.

Accordingly, in one exemplary embodiment, the narrowed search procedure involves detecting the numeral "1" (indicated in a dashed line format) by examining four coordinate locations located in four specific grid sections that constitute a minimal group of grid sections in this case. The presence of a portion of a numeral at the coordinate location 605 (first coordinate location) provides a strong indication that the numeral can be a "1". The identity of the numeral can be confirmed by examining three additional coordinate locations, which in this case correspond to the coordinate location 610, the coordinate location 615, and the coordinate location 620. The presence of other portions of the numeral at each additional coordinate location provides a continuously increasing level of confidence that the numeral is indeed a "1". Thus, testing four coordinate locations at most provides a strong indication that the recognized numeral is a "1" without having to search additional areas of the grid-based template 300. Other numerals can be similarly recognized using fewer or more number of coordinate locations.

Upon completing the search procedure for the numeral "1" at the exemplary coordinate locations, the software algorithm uses a lookup table to at least make a preliminary determination of the identity of the numeral. The lookup table includes information indicating that the numeral "1" is uniquely identifiable via the four coordinates described above.

As another example, a narrowed search procedure for detecting the numeral "7" (indicated in a solid line format) can be carried out by first examining coordinate location 625. The presence of a portion of a numeral at the coordinate location 625 provides a strong indication that the numeral can be a "7". The identity of the numeral can be confirmed by examining additional coordinate locations such as coordinate location 630. The lookup table includes information indicating that the numeral "7" is uniquely identifiable via the coordinate location 625 and/or the coordinate location 630.

Furthermore, in some embodiments, the use of unique coordinate locations as described above, allows for execution of a search procedure for identifying a numeral without necessarily first identifying whether the character is a numeral or a letter.

Figure 7:
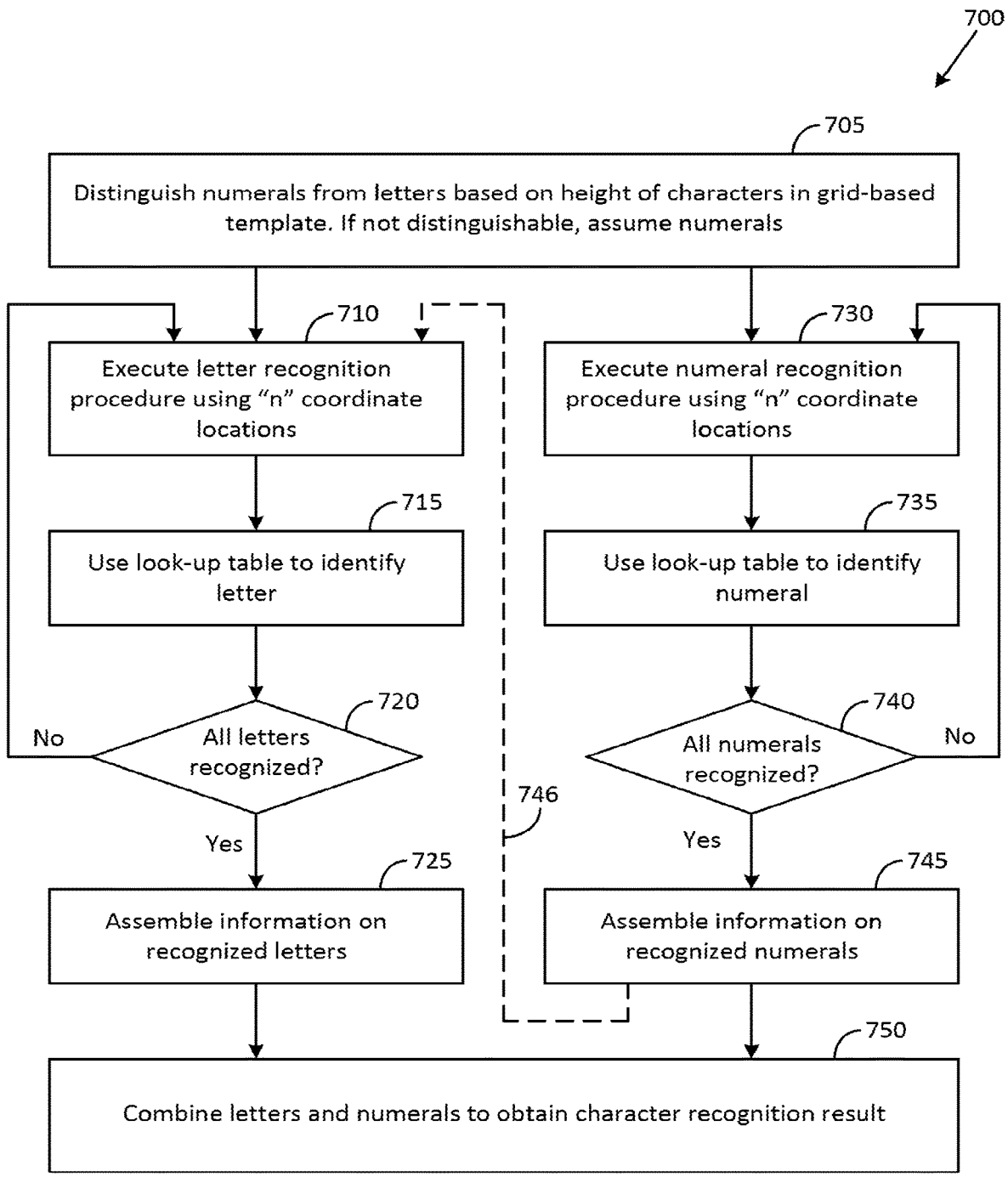
FIG. 7 shows a flowchart of a method to execute optical character recognition in accordance with the disclosure.

FIG. 7 shows a flowchart 700 of a method to execute optical character recognition in accordance with the disclosure. It is to be understood that any method steps or blocks shown in FIG. 7 represent modules, segments, or portions of code that include one or more executable instructions for implementing specific logical functions or steps in the method. In certain implementations, one or more of the steps may be performed manually. It will be appreciated that, although particular example method steps are described below, additional steps or alternative steps may be utilized in various implementations without detracting from the spirit of the invention. Moreover, steps may be executed out of order from that shown or discussed, including substantially concurrently or in reverse order, depending on various alternative implementations. Code may be also contained in one or more devices, and may not be necessarily confined to any one particular type of device.

Block 705 of the flowchart 700 pertains to using a grid-based template such as the grid-based template 300 described above, to first distinguish between the presence of one or more numerals in an image and one or more letters in the image. This action can be carried out as described above, by taking advantage of the characteristic that numerals defined in a monospaced font such as OCR-B are taller than letters that are also defined in the monospaced font. If a numeral cannot be distinguished from a letter (due to various reasons), the action indicated by block 705 assumes that the image contains numerals and the method step indicated in block 730 is executed. On the other hand, if a determination is made in block 705 that the image contains numerals and may contain letters as well, either one of the method step indicated in block 730 or the method step indicated in block 710 can be executed following execution of block 705.

Block 730 pertains to executing a numeral recognition procedure (as described above with reference to FIG. 6) using "n" coordinate locations in the grid-based template to uniquely identify one or more numerals. It should be understood that in some cases, "n" can be equal to 1, such as by examining only coordinate location 605 for detecting a portion of the numeral "1" with a certain level of confidence. The confidence level can be raised by confirming the identity of the numeral "1" by examining additional coordinate locations, such as coordinate location 610, coordinate location 615, and coordinate location 620. The improvement in confidence level is obtained at the expense of increased computation time. Consequently, the value of "n" that is selected for carrying out the action indicated in block 730 is based on a trade-off between confidence in recognition and speed of operation.

Block 735 pertains to using a look-up table to identify the detected data obtained by carrying out the action indicated in block 730. Thus, for example, the lookup table is used to identify the numeral "1" based on detecting the presence of a portion of the numeral at coordinate location 605 (and confirmed by the presence of other portions of the numeral at coordinate location 610, coordinate location 615, and/or coordinate location 620).

In block 740 a determination is made if additional numerals contained in the image are to be recognized. If yes, operation proceeds from block 740 back to block 730. If no, operation proceeds from block 740 to block 745.

Block 745 pertains to assembling information on recognized numerals obtained by executing the previous blocks (block 730, block 735, and block 740). At this point, in one exemplary implementation the action proceeds from block 745 to block 750 where the one or more recognized numerals are provided as a character recognition result. For example, the action indicated in block 750 can pertain to combining multiple recognized digits of a barcode label and providing the character recognition result to a computer for identifying an object upon which the barcode label is affixed.

However, in another exemplary implementation, when a character recognition procedure involves recognizing both letters and numerals, the action proceeds from block 745 to block 710 (as indicated by dashed line 746).

In yet another exemplary implementation, rather than proceeding from block 745 to block 710, the method step indicated in block 710 is executed following execution of block 705. Subsequent actions indicated in block 715, block 720, and block 725 for recognizing one or more letters can then be executed in parallel with actions indicated in block 730, block 735, block 740, and block 745 for recognizing one or more numerals.

Block 710 pertains to executing a letter recognition procedure (as described above with reference to FIG. 4 and FIG. 5) using "n" coordinate locations in the grid-based template to uniquely identify one or more letters. The value of "n" can be selected using similar criteria as described above with respect to block 730 for recognizing numerals. It should be therefore understood that the value of "n" selected for carrying out the action indicated in block 710 is based on a trade-off between confidence in recognition and speed of operation.

Block 715 pertains to using a look-up table to identify the detected data obtained by carrying out the action indicated in block 710. Thus, for example, the lookup table is used to identify the letter "A" based on detecting the presence of a portion of the letter at coordinate location 405.

In block 720 a determination is made if additional letters contained in the image are to be recognized. If yes, operation proceeds from block 720 back to block 710. If no, operation proceeds from block 720 to block 725.

Block 725 pertains to assembling information on recognized letters obtained by executing the previous blocks (block 710, block 715, and block 720). Action proceeds from block 725 to block 750 where the one or more recognized letters are combined with one or more recognized numerals (derived by executing actions indicated in block 745) and provided as a character recognition result.

The description above pertained to using "n" coordinate locations to identify one or more letters and/or one or more numerals with various levels of confidence. A single-step character recognition procedure in accordance with the disclosure, which will be described below in more detail, involves presetting "n" to a certain value so as to quickly and uniquely recognize any letter or numeral in a single step. The presetting can be carried out in various ways such as by using statistics to identify a suitable Hamming distance that is indicative of differences between various characters.

Figure 8:
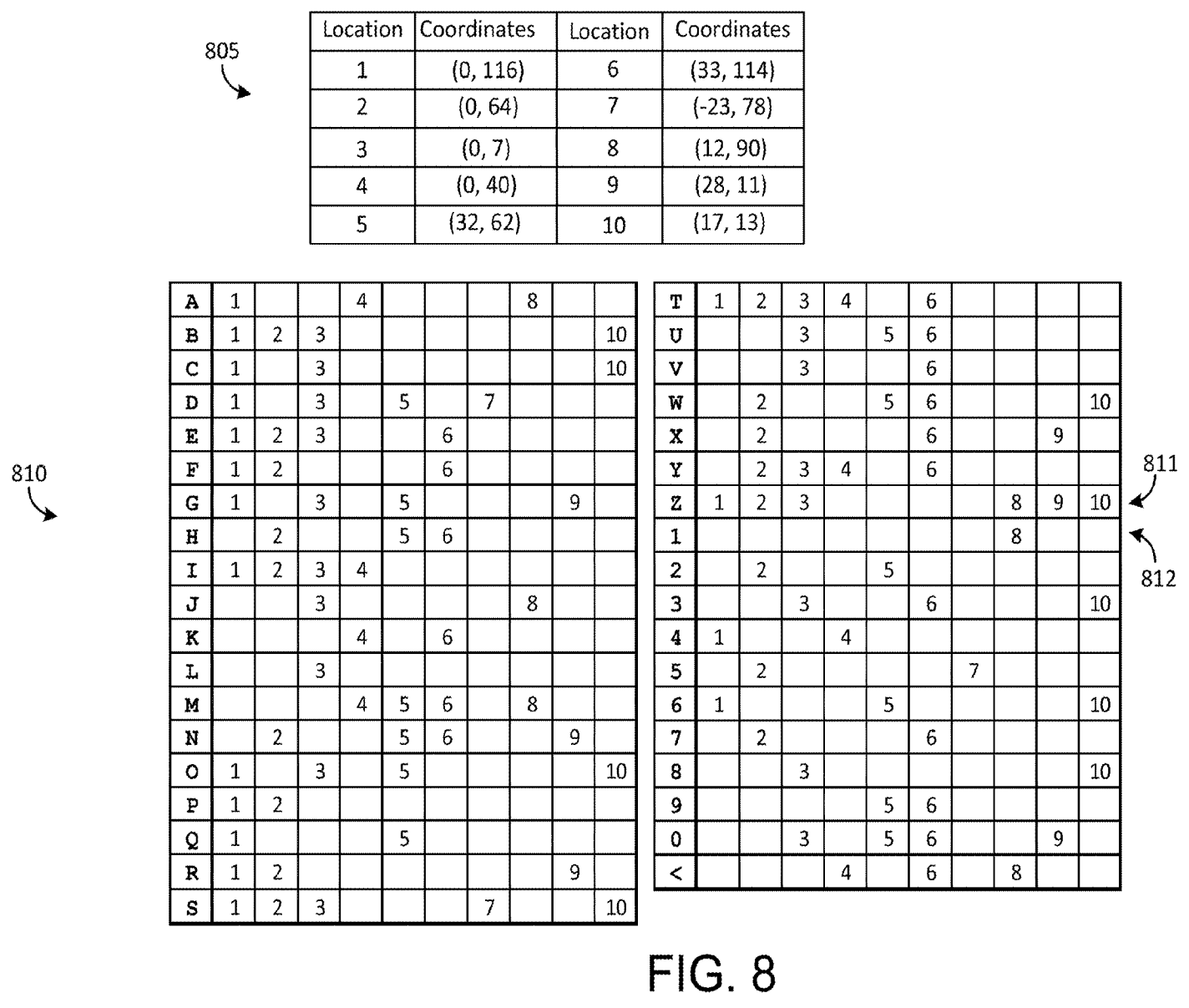

FIG. 8 shows an exemplary set of coordinate locations 805 (wherein "n" has been preset to an exemplary value equal to ten) and a look-up table 810 that can be used in conjunction with the set of coordinate locations 805 to uniquely identify any monospaced character using a single-step recognition procedure.

As can be understood from the set of coordinate locations 805, the first location of the ten locations corresponds to the coordinates (0,116) on a grid-based template such as the grid-based template 300 described above; the second location of the ten locations corresponds to the coordinates (0,64); the third location of the ten locations corresponds to the coordinates (0,7), and so on. The look-up table 810 includes uppercase letters (A to Z), numbers (0 to 9), and a "less than" symbol ("<"), each of which is formatted in an OCR-B font. The OCR-B font is based on a centerline drawing standard specified by the International Organization for Standardization (ISO), and the OCR-B character subset that is used in passports is defined by ICAO to include capital letters, numerals and the symbol "<" as enumerated in the look-up table 810.

A single-step recognition procedure in accordance with the disclosure involves using an OCR system (such as the OCR system 200 described above), to examine each of the ten locations identified in the of set of coordinate locations 805. Thus, for example, if a portion of a character is detected at a coordinate location (12, 90), the OCR software 206 utilizes the set of coordinate locations 805 to recognize this coordinate location as corresponding to location 8. Let it be assumed for purposes of example, that no other portion of the character is detected at any of the remaining nine locations in the set of coordinate locations 805. The OCR software 206 then utilizes the look-up table 810 to identify (via row 812) that the character to be recognized is the numeral "1". On the other hand, if other portions of the character are detected, for example at locations 1, 2, 3, 9, and 10, the OCR software 206 utilizes the look-up table 810 to identify (via row 811) that the character is the letter "Z" and not the numeral "1".

It will also be pertinent to point out that unlike the character recognition procedures described above with respect to FIG. 4 and FIG. 6 that distinguish between a numeral and a letter based on the centerline height difference between numerals and letters of a monospaced font, the single-step recognition procedure does not require examination of the centerline height difference between two or more characters. However, utilizing the single-step recognition procedure provides a savings in time in comparison to many traditional character recognition procedures and this savings in time can be optionally used to execute additional procedures such as using the grid-based template and/or applying statistics to confirm a character recognition result obtained via the single-step recognition procedure. Thus, for example, a grid-based template (such as the grid-based template 300) can be utilized to execute a character recognition procedure for confirming the identity of a character recognized by utilizing the single-step recognition procedure.

To supplement the present disclosure, this application incorporates entirely by reference the following commonly assigned patents, patent application publications, and patent applications:

U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;
U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;

U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; 8,740,082;
U.S. Pat. Nos. 8,740,085; 8,746,563;
U.S. Pat. Nos. 8,750,445; 8,752,766;
U.S. Pat. Nos. 8,756,059; 8,757,495;
U.S. Pat. Nos. 8,760,563; 8,763,909;
U.S. Pat. Nos. 8,777,108; 8,777,109;
U.S. Pat. Nos. 8,779,898; 8,781,520;
U.S. Pat. Nos. 8,783,573; 8,789,757;
U.S. Pat. Nos. 8,789,758; 8,789,759;
U.S. Pat. Nos. 8,794,520; 8,794,522;
U.S. Pat. Nos. 8,794,525; 8,794,526;
U.S. Pat. Nos. 8,798,367; 8,807,431;
U.S. Pat. Nos. 8,807,432; 8,820,630;
U.S. Pat. Nos. 8,822,848; 8,824,692;
U.S. Pat. Nos. 8,824,696; 8,842,849;
U.S. Pat. Nos. 8,844,822; 8,844,823;
U.S. Pat. Nos. 8,849,019; 8,851,383;
U.S. Pat. Nos. 8,854,633; 8,866,963;
U.S. Pat. Nos. 8,868,421; 8,868,519;
U.S. Pat. Nos. 8,868,802; 8,868,803;
U.S. Pat. Nos. 8,870,074; 8,879,639;
U.S. Pat. Nos. 8,880,426; 8,881,983;
U.S. Pat. Nos. 8,881,987; 8,903,172;
U.S. Pat. Nos. 8,908,995; 8,910,870;
U.S. Pat. Nos. 8,910,875; 8,914,290;
U.S. Pat. Nos. 8,914,788; 8,915,439;
U.S. Pat. Nos. 8,915,444; 8,916,789;
U.S. Pat. Nos. 8,918,250; 8,918,564;
U.S. Pat. Nos. 8,925,818; 8,939,374;
U.S. Pat. Nos. 8,942,480; 8,944,313;
U.S. Pat. Nos. 8,944,327; 8,944,332;
U.S. Pat. Nos. 8,950,678; 8,967,468;
U.S. Pat. Nos. 8,971,346; 8,976,030;
U.S. Pat. Nos. 8,976,368; 8,978,981;
U.S. Pat. Nos. 8,978,983; 8,978,984;
U.S. Pat. Nos. 8,985,456; 8,985,457;
U.S. Pat. Nos. 8,985,459; 8,985,461;
U.S. Pat. Nos. 8,988,578; 8,988,590;
U.S. Pat. Nos. 8,991,704; 8,996,194;
U.S. Pat. Nos. 8,996,384; 9,002,641;
U.S. Pat. Nos. 9,007,368; 9,010,641;
U.S. Pat. Nos. 9,015,513; 9,016,576;
U.S. Pat. Nos. 9,022,288; 9,030,964;
U.S. Pat. Nos. 9,033,240; 9,033,242;
U.S. Pat. Nos. 9,036,054; 9,037,344;
U.S. Pat. Nos. 9,038,911; 9,038,915;
U.S. Pat. Nos. 9,047,098; 9,047,359;
U.S. Pat. Nos. 9,047,420; 9,047,525;
U.S. Pat. Nos. 9,047,531; 9,053,055;
U.S. Pat. Nos. 9,053,378; 9,053,380;
U.S. Pat. Nos. 9,058,526; 9,064,165;
U.S. Pat. Nos. 9,064,165; 9,064,167;
U.S. Pat. Nos. 9,064,168; 9,064,254;
U.S. Pat. Nos. 9,066,032; 9,070,032;
U.S. Pat. Nos. 9,076,459; 9,079,423;
U.S. Pat. Nos. 9,080,856; 9,082,023;
U.S. Pat. Nos. 9,082,031; 9,084,032;
U.S. Pat. Nos. 9,087,250; 9,092,681;
U.S. Pat. Nos. 9,092,682; 9,092,683;
U.S. Pat. Nos. 9,093,141; 9,098,763;
U.S. Pat. Nos. 9,104,929; 9,104,934;
U.S. Pat. Nos. 9,107,484; 9,111,159;
U.S. Pat. Nos. 9,111,166; 9,135,483;
U.S. Pat. Nos. 9,137,009; 9,141,839;
U.S. Pat. Nos. 9,147,096; 9,148,474;
U.S. Pat. Nos. 9,158,000; 9,158,340;
U.S. Pat. Nos. 9,158,953; 9,159,059;
U.S. Pat. Nos. 9,165,174; 9,171,543;
U.S. Pat. Nos. 9,183,425; 9,189,669;
U.S. Pat. Nos. 9,195,844; 9,202,458;
U.S. Pat. Nos. 9,208,366; 9,208,367;
U.S. Pat. Nos. 9,219,836; 9,224,024;
U.S. Pat. Nos. 9,224,027; 9,230,140;
U.S. Pat. Nos. 9,235,553; 9,239,950;
U.S. Pat. Nos. 9,245,492; 9,248,640;
U.S. Pat. Nos. 9,250,652; 9,250,712;
U.S. Pat. Nos. 9,251,411; 9,258,033;
U.S. Pat. Nos. 9,262,633; 9,262,660;
U.S. Pat. Nos. 9,262,662; 9,269,036;
U.S. Pat. Nos. 9,270,782; 9,274,812;
U.S. Pat. Nos. 9,275,388; 9,277,668;
U.S. Pat. Nos. 9,280,693; 9,286,496;
U.S. Pat. Nos. 9,298,964; 9,301,427;
U.S. Pat. Nos. 9,313,377; 9,317,037;
U.S. Pat. Nos. 9,319,548; 9,342,723;
U.S. Pat. Nos. 9,361,882; 9,365,381;
U.S. Pat. Nos. 9,373,018; 9,375,945;
U.S. Pat. Nos. 9,378,403; 9,383,848;
U.S. Pat. Nos. 9,384,374; 9,390,304;
U.S. Pat. Nos. 9,390,596; 9,411,386;
U.S. Pat. Nos. 9,412,242; 9,418,269;
U.S. Pat. Nos. 9,418,270; 9,465,967;
U.S. Pat. Nos. 9,423,318; 9,424,454;
U.S. Pat. Nos. 9,436,860; 9,443,123;
U.S. Pat. Nos. 9,443,222; 9,454,689;
U.S. Pat. Nos. 9,464,885; 9,465,967;
U.S. Pat. Nos. 9,478,983; 9,481,186;
U.S. Pat. Nos. 9,487,113; 9,488,986;
U.S. Pat. Nos. 9,489,782; 9,490,540;
U.S. Pat. Nos. 9,491,729; 9,497,092;
U.S. Pat. Nos. 9,507,974; 9,519,814;
U.S. Pat. Nos. 9,521,331; 9,530,038;
U.S. Pat. Nos. 9,572,901; 9,558,386;
U.S. Pat. Nos. 9,606,581; 9,646,189;
U.S. Pat. Nos. 9,646,191; 9,652,648;
U.S. Pat. Nos. 9,652,653; 9,656,487;
U.S. Pat. Nos. 9,659,198; 9,680,282;
U.S. Pat. Nos. 9,697,401; 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;
U.S. Design Pat. No. D766,244;
U.S. Design Pat. No. D777,166;
U.S. Design Pat. No. D771,631;
U.S. Design Pat. No. D783,601;
U.S. Design Pat. No. D785,617;

U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;
U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;

U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;
U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;

U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, exemplary embodiments of the invention have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. A system, comprising:
   a processor; and
   a non-transitory memory that stores executable instructions that, when executed by the processor, cause the processor to:
   apply a bounding box to a character contained in a barcode label;
   designate a location of the bounding box as an identification area in the bounding box, wherein, in response to the character being present in the bounding box, the identification area is configured to contain a portion of the character and exclude all portions of all other characters in a set of characters associated with the bounding box; and
   perform optical character recognition with respect to the identification area to detect a portion of the character that uniquely identifies the character from among the set of characters.

2. The system of claim 1, wherein the executable instructions further cause the processor to:
   apply a grid-based template to the bounding box; and
   define a portion of the grid-based template as a primary search area, wherein the primary search area is an area within the bounding box and is smaller than the bounding box.

3. The system of claim 2, wherein the executable instructions further cause the processor to:
   identify the character contained in the bounding box based on the primary search area.

4. The system of claim 2, wherein the executable instructions further cause the processor to:
   define a set of locations inside the primary search area, wherein a location of the set of locations is identifiable by coordinates of an x-y mapping system.

5. The system of claim 1, wherein the executable instructions further cause the processor to:
   apply a grid-based template to the bounding box; and
   define a portion of the grid-based template as a primary search area shaped as a circle that comprises a diameter that is substantially equal to a width of a monospaced font, wherein the primary search area is an area within the bounding box and is smaller than the bounding box.

6. The system of claim 1, wherein the executable instructions further cause the processor to:
   apply a grid-based template to the bounding box; and
   define a portion of the grid-based template as a primary search area shaped as an oval that comprises a diameter that is substantially equal to a width of a monospaced font, wherein the primary search area is an area within the bounding box and is smaller than the bounding box.

7. The system of claim 1, wherein the character comprises a monospaced font and comprises any one of a numeral, a letter, or a mathematical symbol.

8. The system of claim 1, wherein the bounding box comprises a grid pattern that is characterized using coordinates of an x-y mapping system.

9. A computer-implemented method, comprising:
   applying, by a device comprising a processor, a bounding box to a character contained in a barcode label;
   designating, by the device, a location of the bounding box as an identification area in the bounding box, wherein, in response to the character being present in the bounding box, the identification area is configured to contain a portion of the character and exclude all portions of all other characters in a set of characters associated with the bounding box; and
   performing, by the device, optical character recognition with respect to the identification area to detect a portion of the character that uniquely identifies the character from among the set of characters.

10. The computer-implemented method of claim 9, further comprising:
    applying, by the device, a grid-based template to the bounding box; and
    defining, by the device, a portion of the grid-based template as a primary search area, wherein the primary search area is an area within the bounding box and is smaller than the bounding box.

11. The computer-implemented method of claim 10, further comprising:
    identifying, by the device, the character contained in the bounding box based on the primary search area.

12. The computer-implemented method of claim 10, further comprising:
defining, by the device, a set of locations inside the primary search area, wherein a location of the set of locations is identifiable by coordinates of an x-y mapping system.

13. The computer-implemented method of claim 9, further comprising:
applying, by the device, a grid-based template to the bounding box; and
defining, by the device, a portion of the grid-based template as a primary search area shaped as a circle that comprises a diameter that is substantially equal to a width of a monospaced font, wherein the primary search area is an area within the bounding box and is smaller than the bounding box.

14. The computer-implemented method of claim 9, further comprising:
applying, by the device, a grid-based template to the bounding box; and
defining, by the device, a portion of the grid-based template as a primary search area shaped as an oval that comprises a diameter that is substantially equal to a width of a monospaced font, wherein the primary search area is an area within the bounding box and is smaller than the bounding box.

15. A computer program product comprising at least one non-transitory computer-readable storage medium having program instructions embodied thereon, the program instructions executable by a processor to cause the processor to:
apply a bounding box to a character contained in a barcode label;
designate a location of the bounding box as an identification area in the bounding box, wherein, in response to the character being present in the bounding box, the identification area is configured to contain a portion of the character and exclude all portions of all other characters in a set of characters associated with the bounding box; and
perform optical character recognition with respect to the identification area to detect a portion of the character that uniquely identifies the character from among the set of characters.

16. The computer program product of claim 15, wherein the program instructions are executable by the processor to cause the processor to:
apply a grid-based template to the bounding box; and
define a portion of the grid-based template as a primary search area, wherein the primary search area is an area within the bounding box and is smaller than the bounding box.

17. The computer program product of claim 16, wherein the program instructions are executable by the processor to cause the processor to:
identify the character contained in the bounding box based on the primary search area.

18. The computer program product of claim 16, wherein the program instructions are executable by the processor to cause the processor to:
define a set of locations inside the primary search area, wherein a location of the set of locations is identifiable by coordinates of an x-y mapping system.

19. The computer program product of claim 15, wherein the program instructions are executable by the processor to cause the processor to:
apply a grid-based template to the bounding box; and
define a portion of the grid-based template as a primary search area shaped as a circle that comprises a diameter that is substantially equal to a width of a monospaced font, wherein the primary search area is an area within the bounding box and is smaller than the bounding box.

20. The computer program product of claim 15, wherein the program instructions are executable by the processor to cause the processor to:
apply a grid-based template to the bounding box; and
define a portion of the grid-based template as a primary search area shaped as an oval that comprises a diameter that is substantially equal to a width of a monospaced font, wherein the primary search area is an area within the bounding box and is smaller than the bounding box.

* * * * *